United States Patent
Nakanishi

(10) Patent No.: US 7,209,982 B2
(45) Date of Patent: Apr. 24, 2007

(54) ELECTRONIC APPARATUS INCLUDING PLURAL PROCESSORS

(75) Inventor: Akira Nakanishi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 372 days.

(21) Appl. No.: 10/958,597

(22) Filed: Oct. 6, 2004

(65) Prior Publication Data

US 2005/0097279 A1 May 5, 2005

(30) Foreign Application Priority Data

Oct. 31, 2003 (JP) .............................. 2003-372445

(51) Int. Cl.
*G06F 12/00* (2006.01)
*G06F 9/26* (2006.01)

(52) U.S. Cl. ....................................................... 710/38

(58) Field of Classification Search .................. 710/38
See application file for complete search history.

(56) References Cited

U.S. PATENT DOCUMENTS 5,237,670 A * 8/1993 Wakerly ..................... 710/100

2005/0080975 A1 * 4/2005 Elledge et al. .............. 710/316

FOREIGN PATENT DOCUMENTS

| JP | 5-216802 | 8/1993 |
| JP | 11-250569 | 9/1999 |

* cited by examiner

*Primary Examiner*—Kevin L. Ellis
*Assistant Examiner*—Hamdy Ahmed
(74) *Attorney, Agent, or Firm*—Finnegan, Henderson, Farabow, Garrett & Dunner, L.L.P.

(57) ABSTRACT

An electronic apparatus includes first and second processors which execute first and second operating systems, first disk controller which accesses a disk storage device in response to a disk access request from the first processor, a second disk controller which accesses the disk storage device in response to a disk access request from the second processor, a switch device to connect one of the first and second disk controllers to the disk storage device, and a unit for switching an access path, which is used when the first processor accesses the disk storage device, between a first access pass in which the first processor executes access to the disk storage device via the second processor, and a second access pass in which the first processor executes access to the disk storage device without intervention of the second processor.

11 Claims, 6 Drawing Sheets

ELECTRONIC APPARATUS INCLUDING PLURAL PROCESSORS

CROSS-REFERENCE TO RELATED APPLICATIONS

This application is based upon and claims the benefit of priority from prior Japanese Patent Applications No. 2003-372445, filed Oct. 31, 2003, the entire contents of which are incorporated herein by reference.

BACKGROUND OF THE INVENTION

1. Field of the Invention

The present invention relates generally to an electronic apparatus including a plurality of processors, and more particularly to an electronic apparatus including a plurality of processors and a disk storage device that is shared by the processors.

2. Description of the Related Art

In recent years, a variety of electronic apparatus, such as a video recorder, a TV and a network device, have been developed as so-called information appliances. Not only in computer systems but also in these electronic apparatuses, a system architecture including a plurality of processors has begun to be adopted in order to efficiently execute various functions.

Jpn. Pat. Appln. KOKAI Publication No. 5-216802 discloses a dual port hard disk that has two ports. The dual port hard disk has two ports ch1 and ch2 that can independently be accessed by different CPUs.

In a system including two CPUs that execute different operating systems, if the CPUs are configured to be able to independently access the hard disk, a competition for access to the hard disk occurs and it becomes difficult to keep consistency in data between file systems of the operating systems.

If the operating system that is executed by one of the CPUs breaks down, this CPU would erroneously continue to occupy the hard disk, leading to such a danger that the other CPU is unable to access the hard disk.

BRIEF SUMMARY OF THE INVENTION

According to an embodiment of the present invention, there is provided an electronic apparatus comprising: a disk storage device; a first processor which executes a first operating system; a first disk controller which accesses the disk storage device in response to a disk access request from the first processor; a second processor which executes a second operating system; a second disk controller which accesses the disk storage device in response to a disk access request from the second processor; a switch device configured to selectively connect the first disk controller and the second disk controller to the disk storage device; and means for switching an access path, which is used when the first processor accesses the disk storage device, between a first access pass in which the first processor executes access to the disk storage device via the second processor while the second disk controller is connected to the disk storage device, and a second access pass in which the first processor executes access to the disk storage device without intervention of the second processor while the first disk controller is connected to the disk storage device.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a flow chart illustrating a process procedure that is executed when the system of FIG. 1 is powered on;

DETAILED DESCRIPTION OF THE INVENTION

An embodiment of the present invention will now be described with reference to the accompanying drawings.

Figure 1:
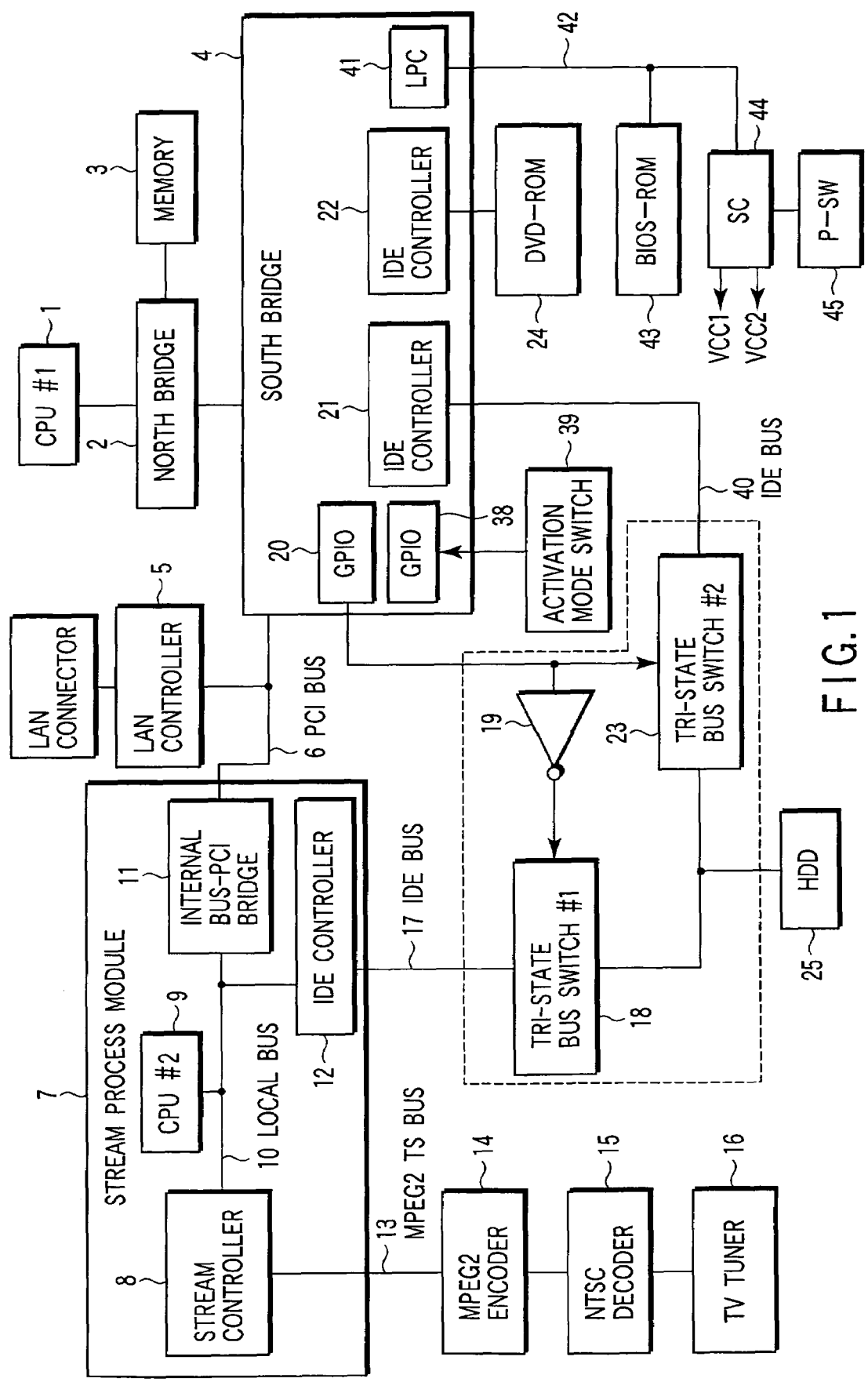
FIG. 1 is a block diagram showing a system configuration of an electronic apparatus according to an embodiment of the present invention.

FIG. 1 shows the configuration of an electronic apparatus according to the embodiment of the invention. The electronic apparatus is realized as a home network server.

The home network server is an electronic apparatus having a router function and a video recorder function. The home network server has a first CPU (CPU #1) 1 and a second CPU (CPU #2) 9 in order to efficiently execute the router function and video recorder function. The first CPU 1 is a processor that controls the operation of the home network server and is always operating to execute the router function. The second CPU 9 is a processor for executing the video recorder function. Only when broadcast program data such as TV program data needs to be recorded, will the second CPU 9 execute the associated process. In order to reduce the power consumption of the second CPU 9, the first CPU 1 has a function of setting the second CPU 9 in a non-operative state (operation halt state) such as a sleep state, a power-off state, where necessary.

The system configuration of the home network server is described in detail.

As is shown in FIG. 1, the home network server includes, in addition to the CPU 1, a north bridge 2, a memory 3, a south bridge 4, a LAN (Local Area Network) controller 5, a PCI (Peripheral Component Interconnect) bus 6, a stream process module 7, an MPEG2 (MPEG: Moving Picture Experts Group) encoder 14, an NTSC (National TV Standards Committee) decoder 15, a TV tuner 16, a first tri-state bus switch 18, an inverter 19, a second tri-state bus switch 23, a DVD-ROM drive 24, a hard disk drive (HDD) 25, a BIOS-ROM 43, and a system controller (SC) 44.

The CPU (Central Processing Unit) 1 executes a first operating system and an application program, which are loaded in the memory 3 from the hard disk drive (HDD) 25. The application program includes a routine for controlling communication with an external device via the LAN controller 5, thereby to execute the router function. The CPU 1 also executes a BIOS (Basic Input/Output System) that is stored in the BIOS-ROM 43.

The south bridge 4 includes, as shown in FIG. 1, a general-purpose I/O port (GPIO) 20, an IDE (Integrated Drive Electronics) controller 21, an IDE controller 22, a general-purpose I/O port (GPIO) 38, an LPC (Low Pin Count) bus interface 41. The IDE controller 21 is a disk controller that accesses via an IDE bus 40 the HDD 25 in response to a disk access request from the CPU 1. The IDE controller 22 accesses the DVD-ROM drive 24 in response to a disk access request from the CPU 1. The LPC bus interface 41 is an interface unit that executes communication with the BIOS-ROM 43 and system controller (SC) 44 that are connected to an LPC bus 42.

The system controller (SC) 44 is a power supply controller that powers on/off the home network server in response to an operation of a power switch (P-SW) 45 by the user. The system controller (SC) 44 comprises a 1-chip microcomputer.

The stream process module 7 is a device for processing an AV (audio/video) stream such as broadcast program data. The stream process module 7 is realized as a PCI device. The stream process module 7 includes the aforementioned second CPU (CPU #2) 9. The stream process module 7 also includes a stream controller 8 that processes an AV (audio/video) stream, a local bus 10, an internal bus-PCI bridge 11 and an IDE controller 12. The second CPU 9 is a processor for controlling the stream controller 8, internal bus-PCI bridge 11 and IDE controller 12. The second CPU 9 executes a second operating system that is stored in the HDD 25, thereby executing a write process for writing an AV stream in the HDD 25 as a file.

The internal bus-PCI bridge 11 is a bridge device that connects the local bus 10 and PCI bus 6. The internal bus-PCI bridge 11 includes a register set for communication with the first CPU 1. The IDE controller 12 is a disk controller that accesses the HDD 25 via an IDE bus 17 in response to a disk access request from the second CPU 9.

The TV tuner 16 is a device for receiving broadcast program data. The TV tuner 16 receives broadcast program data of a channel number that is designated by the user. Audio data and video data, which are included in the broadcast program data received by the TV tuner 16, are sent to the MPEG2 encoder 14 via the NTSC decoder 15. The MPEG2 encoder 14 compression-encodes the audio data and video data and generates an MPEG2 transport stream (MPEG2 TS).

The first tri-state bus switch 18, second tri-state bus switch 23 and inverter 19 constitute a switch device that switches the IDE controller, to which the HDD 25 is connected, between the IDE controller 21 within the south bridge 4 and the IDE controller 12 within the stream process module 7. The HDD 25 is selectively connected to the IDE controller 12 and the IDE controller 21.

The second CPU 9 is connected to the HDD 25 via the IDE controller 12 and tri-state bus switch 18. The first CPU 1 is connected to the HDD 25 via the north bridge 2, IDE controller 21 and tri-state bus switch 23. The tri-state bus switch 18 is inserted between the IDE controller 12 and HDD 25, and electrically connects/disconnects the IDE controller 12 and HDD 25. Similarly, the tri-state bus switch 23 is inserted between the IDE controller 21 and HDD 25, and electrically connects/disconnects the IDE controller 21 and HDD 25.

The operations of the bus switch 18 and bus switch 23 are controlled by a command that is set in the GPIO 20 by the first CPU 1. A switch control signal that is output from the GPIO 20 is directly delivered to the bus switch 23 and also delivered to the bus switch 18 via the inverter 19. When one of the bus switch 18 and bus switch 23 is turned on, the other is turned off. Thereby, only one of the IDE controller 12 and IDE controller 21 is exclusively connected to the HDD 25.

In the home network server, the bus switch 18 and bus switch 23 are controlled such that the HDD 25 is always connected to the IDE controller 12 while the CPU 9 is in operation. In this case, all accesses to the HDD 25 are executed by the CPU 9. The CPU 1 issues a disk access request for the HDD 25 to the CPU 9, thereby indirectly accessing the HDD 25 via the CPU 9 and IDE controller 12.

In addition, in this home network server, when the HDD 25 is to be recovered to the initial state using, e.g. the DVD-ROM drive 24, the bus switch 18 and bus switch 23 are controlled so that the HDD 25 is connected to the IDE controller 21. Recovery is a process for restoring the contents (programs and data) of the HDD 25 to the initial contents that are effective at the time of shipment of the home network server. In addition, when the state of the CPU 9 is switched from an operative state to a non-operative state, such as a standby state or a power-off state, for a power-saving control, the bus switch 18 and bus switch 23 are controlled such that the HDD 25 is connected to the IDE controller 21. While the HDD 25 is connected to the IDE controller 21, the CPU 1 can directly access the HDD 25 using the IDE controller 21.

An activation mode (boot-up mode) switch 39 is an operation switch that can be operated by the user. The activation mode switch 39 is used to designate one of a normal activation mode for activating both the CPU 1 and CPU 9 and a recovery mode for activating only the CPU 1 and executing a recovery process for the HDD 25.

If the activation mode switch 39 is pressed at the time of powering on the home network server, the recovery mode is selected. In this case, the CPU 1 is activated, but the CPU 9 is kept in the power-off state. Further, the CPU 1 controls the bus switches 18 and 23 such that the HDD 25 is connected to the IDE controller 21.

On the other hand, if the activation mode switch 39 is not pressed at the time of powering on the home network server, the normal activation mode is selected. In this case, both the CPU 1 and CPU 9 are activated. Further, the CPU 1 controls the bus switches 18 and 23 such that the HDD 25 is connected to the IDE controller 12.

As has been described above, in this home network server, the CPU 1 can access the HDD 25 by selectively using two access paths. In normal operation, the CPU 1 controls the bus switches 18 and 23 to connect the HDD 25 to the IDE controller 12, and indirectly accesses the HDD 25 via the CPU 9. This prevents occurrence of a problem of an access competition. When a recovery process for the HDD 25 is to be executed or the CPU 9 is to be set in a non-operative state for power saving, the CPU 1 controls the bus switches 18 and 23 to connect the HDD 25 to the IDE controller 21, and directly accesses the HDD 25 without intervention of the CPU 9.

Figure 2:
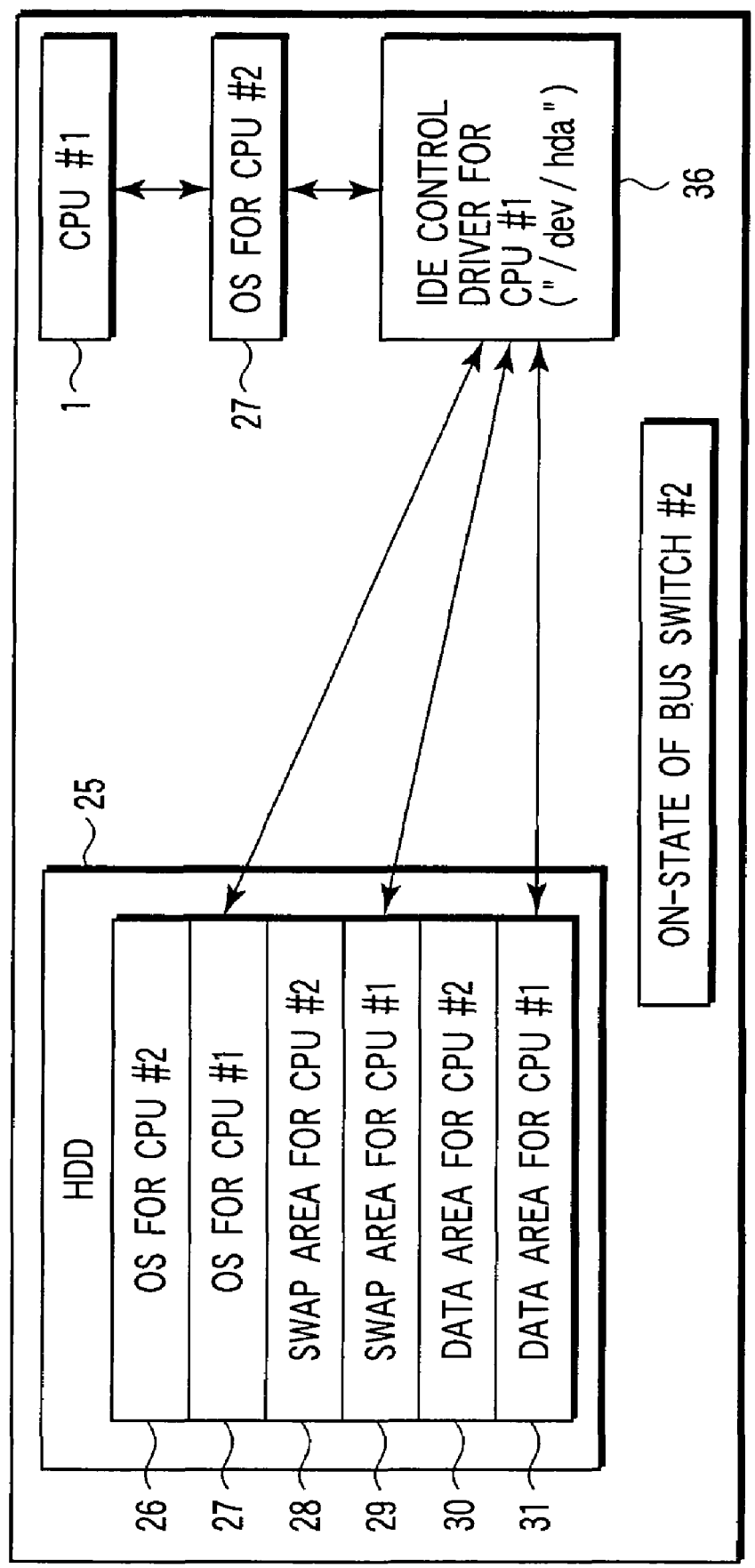
FIG. 2 is a view for explaining an access path, through which a first CPU accesses an HDD in the system of FIG. 1.
Figure 3:
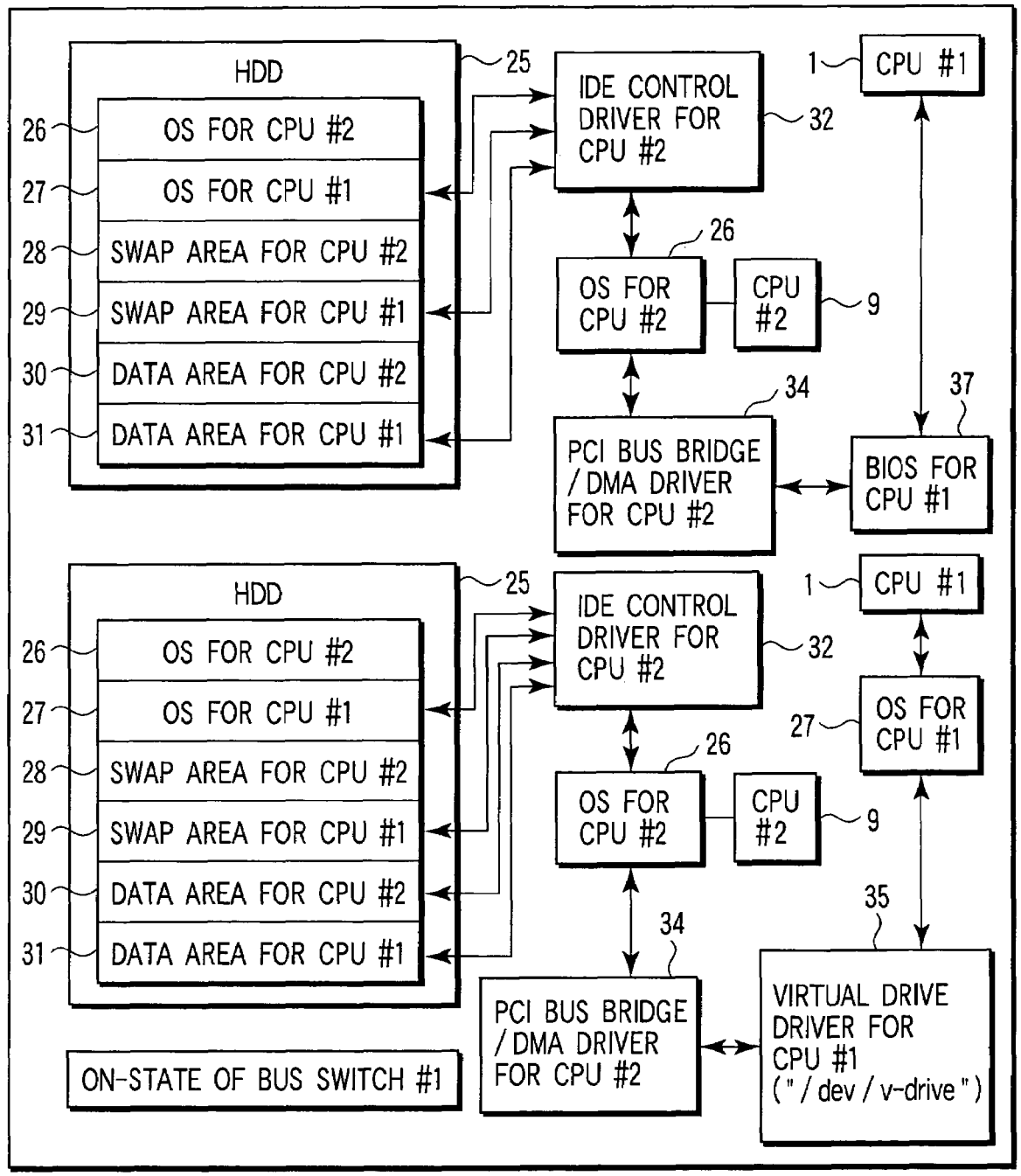
FIG. 3 is a view for explaining an access path, through which the first CPU accesses the HDD via a second CPU in the system of FIG. 1.

Next, referring to FIGS. 2 and 3, a description is given of software modules via which data flows in the two access paths that are used when the CPU 1 accesses the HDD 25.

In the present system, the first CPU (CPU #1) 1 and second CPU (CPU #2) 9 execute different operating systems (OS). The first CPU (CPU #1) 1 executes an OS for CPU #1 and the second CPU (CPU #2) 9 executes an OS for CPU #2. The storage area of the HDD 25 is divided into six partitions, that is, an OS area 26 for CPU #2, an OS area 27 for CPU #1, a swap area 28 for CPU #2, a swap area 29 for CPU #1, a data area 30 for CPU #2 and a data area 31 for CPU #1.

When the second bus switch 23 is turned on, the HDD 25 is connected only to the IDE controller 21. Thus, as shown in FIG. 2, the first CPU (CPU #1) 1 can access the OS area 27, the swap area 29, the data area 31 of the HDD 25 by executing the OS for CPU #1 (OS stored in the OS area 27) and the IDE control driver 36 for controlling the IDE controller 21. The IDE control driver 36 is software module which is embedded in the OS for CPU #1.

In the case where the first bus switch 18 is in the ON state, as shown in FIG. 3, software modules to be used are different before and after activation (boot-up) of the OS for CPU #1. It is to be noted, however, that software modules, which are used in order for the second CPU (CPU #2) 9 to access the HDD 25 via the IDE controller 12, are common before and after the activation of the OS for CPU #1.

The second CPU (CPU #) 9 operates on the OS for CPU #2 (OS stored in the OS area 26). An IDE control driver 32 is embedded in the OS for CPU #2 as a software module that is used in order for the second CPU (CPU #2) 9 to access the HDD 25 via the IDE controller 12. Further, a PCI bus bridge/DMA driver 34 is embedded in the OS 26 for CPU #2. The PCI bus bridge/DMA driver 34 is used in order to receive a disk access request that is issued from the first CPU (CPU #1) 1 to the CPU 9 of the stream process module 7 via the PCI bus 6. The PCI bus bridge/DMA driver 34 is a software module that executes communication with the first CPU (CPU #1) 1 via the PCI bus 6. The PCI bus bridge/DMA driver 34 executes a process for receiving the disk access request from the first CPU (CPU #1) 1 via the PCI bus 6 and a process for transmitting data, which is read out of the HDD 25, to the first CPU (CPU #1) 1 via the PCI bus 6. The respective components in the stream process module 7 are configured to be recognized as PCI devices from the CPU 1 side. Hence, the CPU 1 communicates with the stream process module 7 when it accesses the HDD 25.

When the CPU 1 is activated, this communication is effected via the BIOS 37 that is executed by the CPU 1. The BIOS 37 refers to a value that is set in the GPIO 20 and determines which of the IDE controller 12 and IDE controller 21 is connected to the HDD 25. If the HDD 25 is connected to the IDE controller 12, the BIOS 37 issues a disk access request to the second CPU (CPU #2) 9 via the internal bus-PCI bridge 11 within the stream process module 7, thereby accessing the HDD 25 via the PCI bus bridge/DMA driver 34. On the other hand, if the HDD 25 is connected to the IDE controller 21, the BIOS 37 accesses the HDD 25 via the IDE controller 21. Two kinds of HDD access programs are present in the BIOS 37, and the upper-level software need not recognize which of the IDE controller 12 and IDE controller 21 is connected to the HDD 25.

After the OS for CPU #1 is booted up by the BIOS 37, a virtual drive driver 35 that is embedded in the OS for CPU #1 is activated. The virtual drive driver 35 is a software module for accessing the HDD 25 via the stream process module 7. The virtual drive driver 35 is realized, for instance, as a device driver for controlling the HDD 25 as a virtual drive. Almost all the directories (OS area for CPU #1, swap area for CPU #1, data area for CPU #1, data area for CPU #2) within the HDD 25 are mounted in the virtual drive. Thereby, a disk access request from the CPU 1 with respect to each of the directories mounted in the virtual drive is sent to the virtual drive driver 35. The virtual drive driver 35 issues a disk access request from the CPU 1 to the second CPU (CPU #2) 9 via the internal bus-PCI bridge 11 within the stream process module 7. This enables the HDD 25 to be accessed via the stream process module 7. The data area 30 for CPU #2 is shared by the CPU 1 and CPU 9. The CPU 1 can read out broadcast program data, which is stored on the data area 30 for CPU #2 by the CPU 9, and can transmit the read-out broadcast program data to a personal computer on the network via the LAN controller 5.

The virtual drive driver 35 is a driver that controls the stream process module 7 to access the HDD 25. An upper-level interface of the virtual drive driver 35 is the same as a standard IDE driver. Thus, the virtual drive driver 35 is recognized as an ordinary IDE drive from the upper-level software.

Figure 4:
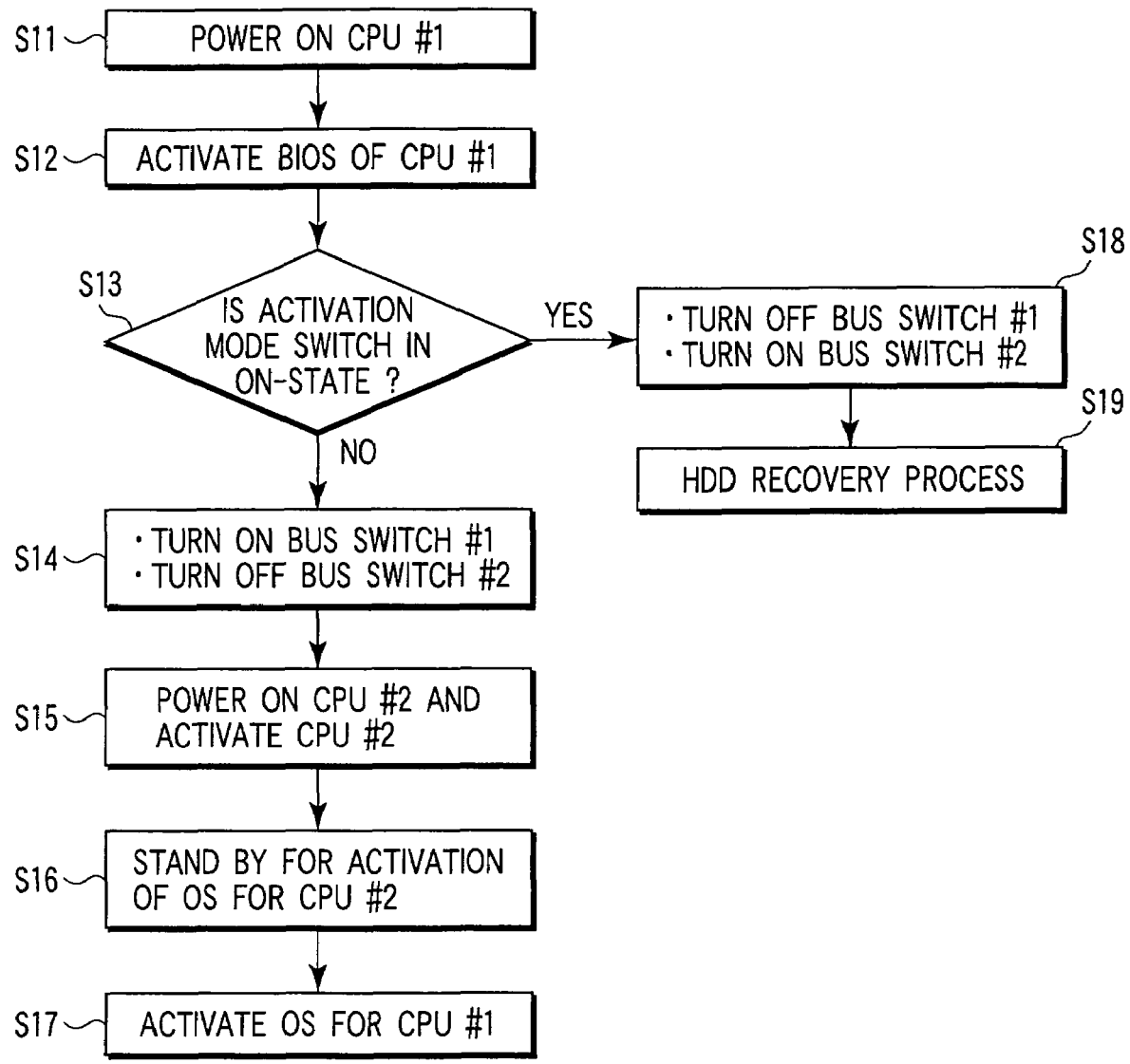

Next, referring to a flow chart of FIG. 4, a description is given of a process procedure that is executed when the home network server is powered on.

If the power switch 45 is turned on, a power supply voltage VCC1 is supplied from the system controller 44 to the first CPU 1 (step S11). The first CPU 1 first executes the BIOS 37 (step S12). The BIOS 37 checks the state of the activation mode switch 39 via the GPIO 38 and determines whether the activation mode switch 39 is in the ON state (step S13).

If the activation mode switch 39 is in the OFF state (NO in step S13), the BIOS 37 determines that the normal activation mode, in which both the first CPU 1 and second CPU 9 are activated, is selected. Then, the BIOS 37 turns on the first bus switch (#1) 18 and turns off the second bus switch (#2) 23, thereby connecting the HDD 25 to the IDE controller 12 (step S14). Subsequently, the BIOS 37 instructs the system controller 44 to supply a power supply voltage VCC2 to the second CPU 9 (step S15). Thereby, the second CPU 9 is powered on, and the second CPU 9 starts a process for activating (booting up) the OS for CPU #2. The BIOS 37 stands by for completion of the activation of the OS for CPU #2 (step S16). If the BIOS 37 communicates with the stream process module 7 and confirms that the activation of the OS for CPU #2 is completed, the BIOS 37 starts a process for activating the OS for CPU #1 (step S17). In step S17, the BIOS 37 issues to the second CPU 9 a disk access request for loading the OS for CPU #1 from the HDD 25. Thereby, the OS for CPU #1 is read out of the HDD 25 via the IDE controller 12 and loaded in the memory 3.

On the other hand, if the activation mode switch 39 is in the ON state (YES in step S13), the BIOS 37 determines that the recovery mode (HDD recovery mode), in which only the first CPU 1 is activated and the recovery process for the HDD 25 is executed, is selected. Then, the BIOS 37 turns off the first bus switch (#1) 18 and turns on the second bus switch (#2) 23, thereby connecting the HDD 25 to the IDE controller 21 (step S18). The BIOS 37 executes the HDD recovery process for restoring the contents of the HDD 25 to the initial state using a recovery medium that is inserted in the DVD-ROM drive 24 (step S19). In step S19, the BIOS 37 writes the recovery image, which is stored in the recovery medium, in the HDD 25 in units of a sector. This write operation is executed via the IDE controller 21.

Figure 5:
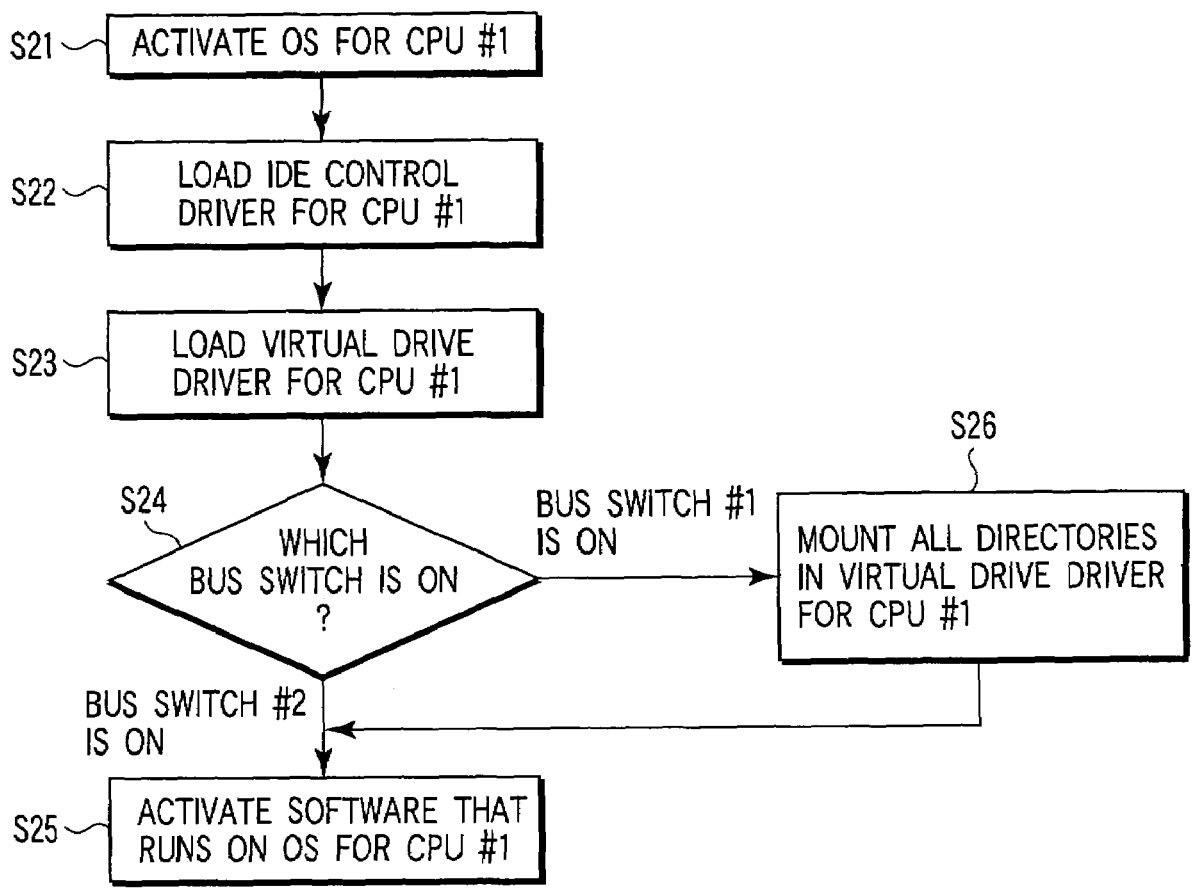
FIG. 5 is a flow chart illustrating a process procedure that is executed when an operating system that is run by the first CPU is activated in the system of FIG. 1.

Next, referring to a flow chart of FIG. 5, a description is given of a process procedure that is executed when the OS for CPU #1 is activated.

The OS for CPU #1 is activated by the BIOS 37 (step S21), and the IDE control driver 36 and virtual drive driver 35 are loaded (step S22 and step S23). Then, the OS for CPU #1 determines, based on the set value of the GPIO 20, which of the IDE controller 12 and IDE controller 21 is connected to the HDD 25, that is, which of the first bus switch (#1) 18 and second bus switch (#2) 23 is turned on (step S24). If the second bus switch (#2) 23 is turned on, the OS for CPU #1 executes a process for loading the application program, etc. from the HDD 25 via the IDE controller 21 (step S25). On the other hand, if the first bus switch (#1) 18 is turned on, the OS for CPU #1 mounts almost all the directories (OS area for CPU #1, swap area for CPU #1, data area for CPU #1, data area for CPU #2) within the HDD 25 in the virtual drive so that the access to the HDD 25 may be executed via the CPU 9 in the stream process module 7 (step S26). Thereby, disk access requests from the upper-level software for the OS area for CPU #1, swap area for CPU #1, data area for CPU #1 and data area for CPU #2 are all sent to the virtual drive driver 35. The virtual drive driver 35 issues a disk access request from the upper-level software to the second CPU 9 of the stream process module 7 via the PCI bus 6, and thus the first CPU 1 can access the HDD 25 via the second CPU 9 and IDE controller 12.

Figure 6:
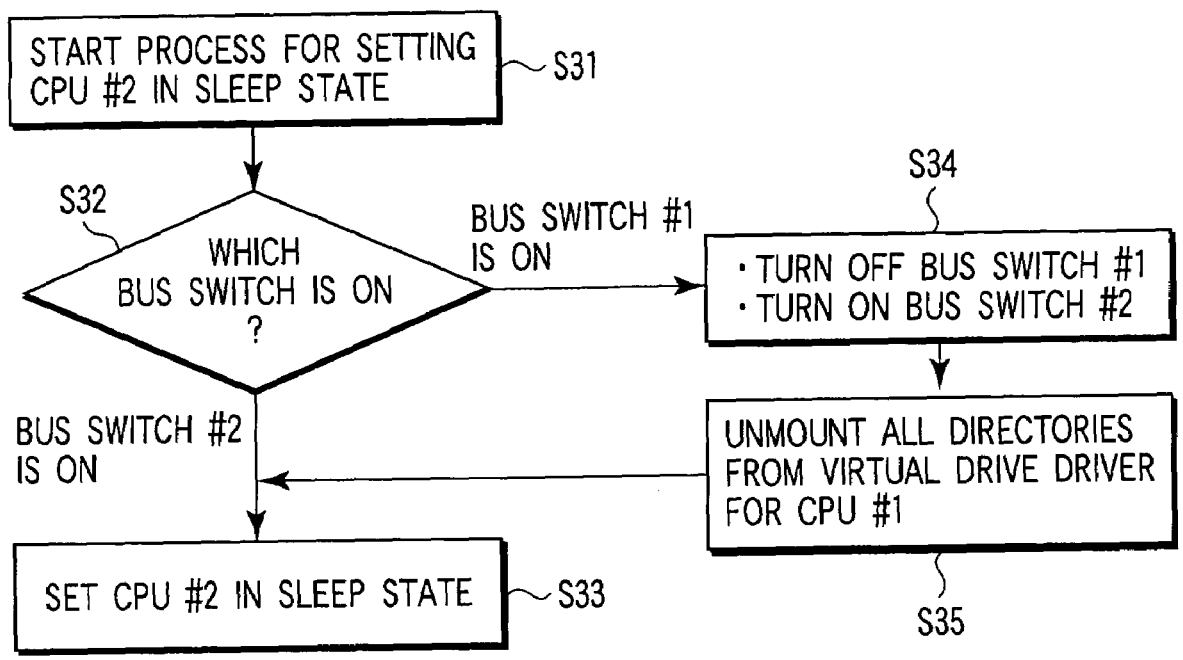
FIG. 6 is a flow chart illustrating a process procedure that is executed by the first CPU when the second CPU is set in a sleep state in the system of FIG. 1.

Next, referring to a flow chart of FIG. 6, a description is given of a process procedure that is executed by the first CPU 1 when the second CPU 9 is set in the operation halt state such as the sleep state.

In the home network server, while the second CPU 9 is in operation, the first CPU 1 indirectly accesses the HDD 25 via the second CPU 9. Thus, when the second CPU 9 is to be set in the operation halt state such as the sleep state, the first CPU 1 executes a process for switching the IDE controller, to which the HDD 25 is connected, from the IDE controller 12 to the IDE controller 21.

If the first CPU 1 detects that the second CPU 9 is in the idle state, the first CPU 1 starts a process for setting the second CPU 9 in the operation halt state such as the sleep state (step S31). In this case, the first CPU 1 determines, based on the set value of the GPIO 20, which of the IDE controller 12 and IDE controller 21 is connected to the HDD 25, that is, which of the first bus switch (#1) 18 and second bus switch (#2) 23 is turned on (step S32). If the second bus switch (#2) 23 is turned on, the first CPU 1 issues a command to the CPU 9 and sets the CPU 9 in the operation halt state such as the sleep state (step S33). In step S33, power supply to the second CPU 9 may be halted.

On the other hand, if the first bus switch (#1) 18 is in the ON state, the first CPU 1 turns off the first bus switch (#1) 18 and turns on the second bus switch (#2) 23, thereby connecting the HDD 25 to the IDE controller 21 (step S34). Then, the first CPU 1 unmounts all the directories, which are mounted in the virtual drive, from the virtual drive so that the access to the HDD 25 may be executed via the IDE control driver 36 and IDE controller 21 (step S35). The first CPU 1 issues a command to the second CPU 9 and sets the second CPU 9 in the operation halt state such as the sleep state (step S33).

Figure 7:
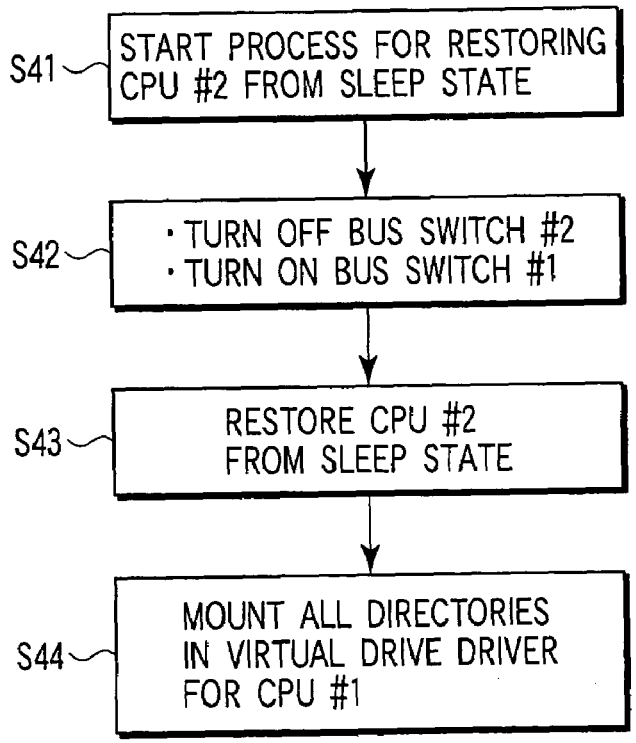
FIG. 7 is a flow chart illustrating a process procedure that is executed by the first CPU when the second CPU is restored from the sleep state in the system of FIG. 1.

Now referring to a flow chart of FIG. 7, a description is given of a process procedure that is executed by the first CPU 1 when the second CPU 9 is restored from the operation halt state, such as the sleep state, to the operative state.

If an event, such as a user's request for broadcast program data recording, occurs, the first CPU 1 starts a process for restoring the second CPU 9 from the sleep state (step S41). In this case, the first CPU 1 turns off the second bus switch (#2) 23 and turns on the first bus switch (#1) 18, thereby connecting the HDD 25 to the IDE controller 12 (step S42). Then, the first CPU 1 starts, e.g. command issuance to the second CPU 9 and power supply to the second CPU 9 using the system controller 44, thereby restoring the second CPU 9 from the sleep state (step S43). The first CPU 1 mounts almost all the directories (OS area for CPU #1, swap area for CPU #1, data area for CPU #1, data area for CPU #2) within the HDD 25 into the virtual drive so that the access to the HDD 25 may be executed via the CPU 9 (step S44).

As has been described above, the path, through which the first CPU 1 accesses the HDD 25, is automatically switched, depending on whether the second CPU 9 is in the operative state or non-operative state (operation halt state). Hence, even if the second CPU 9 is set in the sleep state in order to reduce the power consumption of the second CPU 9, the first CPU 1 is able to continue to normally access the HDD 25.

According to the present embodiment, as described above, the CPU 1 indirectly accesses the HDD 25 via the CPU 9 at the time of normal operations, thereby preventing occurrence of a problem of access competition. The CPU 1 can directly access the HDD 25 without intervention of the CPU 9, by turning on the bus switch 23. Therefore, the CPU 1 can normally execute the access to the HDD 25, even in case of abnormality such as destruction of files in the operating system that is to be executed by the CPU 9.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a disk storage device;
   a first processor which executes a first operating system;
   a first disk controller which accesses the disk storage device in response to a disk access request from the first processor;
   a second processor which executes a second operating system;
   a second disk controller which accesses the disk storage device in response to a disk access request from the second processor;
   a switch device configured to selectively connect the first disk controller and the second disk controller to the disk storage device; and
   means for switching an access path, which is used when the first processor accesses the disk storage device, between a first access pass in which the first processor executes access to the disk storage device via the second processor while the second disk controller is connected to the disk storage device, and a second access pass in which the first processor executes access to the disk storage device without intervention of the second processor while the first disk controller is connected to the disk storage device.

2. The electronic apparatus according to claim 1, wherein the switch device is configured to one of the first disk controller and the second disk controller to the disk storage device in accordance with a command from the first processor.

3. The electronic apparatus according to claim 1, wherein the means for switching the access path includes means for controlling the switch device to switch the access pass between the first access pass and the second access pass.

4. The electronic apparatus according to claim 1, wherein the disk storage device includes a first storage area which stores the first operating system and a second storage area which stores the second operating system.

5. The electronic apparatus according to claim 1, further comprising means for switching a state of the second processor from an operative state to a non-operative state,
   wherein the means for switching the access path includes means for switching, when the state of the second processor is switched from the operative state to the non-operative state, the access path, from the first access path to the second access path.

6. The electronic apparatus according to claim 1, wherein the means for switching the access path includes means for issuing a disk access request from the first processor to the second processor to execute access to the disk storage device via the first access path.

7. The electronic apparatus according to claim 1, wherein the means for switching the access path includes means for selecting the first access path when the second processor is in an operative state, and selecting the second access path when the second processor is in a non-operative state.

8. The electronic apparatus according to claim 1, further comprising an operation switch that selects one of a first operation mode in which the first processor and the second processor operate, and a second operation mode in which the first processor operates while the second processor is inoperative,
   wherein the means for switching the access path includes means for selecting the first access path when the first operation mode is selected by the operation switch, and selecting the second access path when the second operation mode is selected by the operation switch.

9. A method of accessing a disk storage device provided in an electronic apparatus, the electronic apparatus including a first processor which executes a first operating system, a first disk controller which accesses the disk storage device in response to a disk access request from the first processor, a second processor which executes a second operating system, a second disk controller which accesses the disk storage device in response to a disk access request from the second processor, and the switch device configured to selectively connect the first disk controller and the second disk controller to the disk storage device, the method comprising:
   controlling the switch device to connect the second disk controller to the disk storage device;
   causing the first processor to execute access to the disk storage device via the second processor and the second disk controller;
   switching a state of the second processor from an operative state to a non-operative state;
   controlling the switch device to connect the first disk controller to the disk storage device when the state of the second processor is switched from the operative state to the non-operative state; and
   causing the first processor to execute access to the disk storage device via the first disk controller while the first disk controller is connected to the disk storage device.

10. The method according to claim 9, wherein the disk storage device includes a first storage area which stores the first operating system and a second storage area which stores the second operating system.

11. The method according to claim 9, further comprising:
   restoring the state of the second processor to the operative state; and
   controlling the switch device to connect the second disk controller to the disk storage device when the state of the second processor is restored to the operative state; and
   causing the first processor to execute access to the disk storage device via the second processor and the second disk controller while the second disk controller is connected to the disk storage device.

* * * * *